United States Patent [19]
Cortese et al.

[11] 3,908,811
[45] Sept. 30, 1975

[54] CONVEYOR, PARTICULARLY FOR PASSENGERS

[75] Inventors: Cesare Cortese; Giuseppe Castoldi, both of Turin, Italy

[73] Assignee: Saiag S.p.A. Industria Articoli Gomma, Cirie, Italy

[22] Filed: June 19, 1974

[21] Appl. No.: 480,792

[30] Foreign Application Priority Data
June 22, 1973 Italy.................................. 68866/73
Sept. 27, 1973 Italy.................................. 69849/73

[52] U.S. Cl.............................. 198/16 MS; 198/110
[51] Int. Cl.² ........................................ B65G 23/00
[58] Field of Search........... 198/110, 16 MS; 104/25

[56] References Cited
UNITED STATES PATENTS
3,601,246   8/1971   Dubois................................ 198/110

*Primary Examiner*—Evon C. Blunk
*Assistant Examiner*—Douglas D. Watts
*Attorney, Agent, or Firm*—Sughrue, Rothwell, Mion, Zinn & Macpeak

[57] ABSTRACT

A conveyor comprising an accelerating region, a steady speed region and a decelerating region has its belt composed of belt segments. Each belt segment has a flexible part deflectable from the path of the belt by winding onto a winding member carried by a neighbour segment. The length of the segment wound on the winding member is controlled by a crank fast with the member. The free end of the crank carries a cam follower roller guided on a cam rail.

14 Claims, 10 Drawing Figures

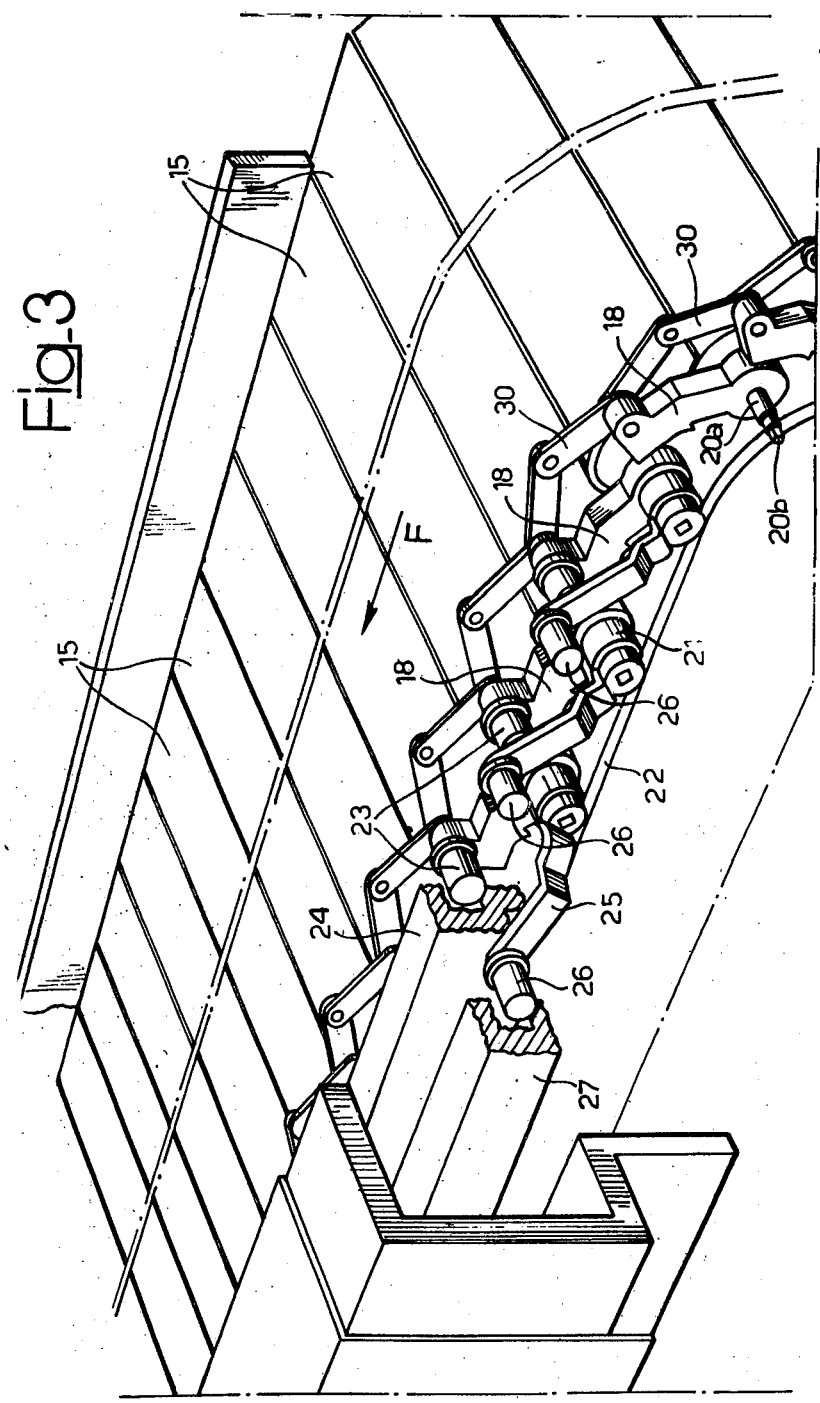

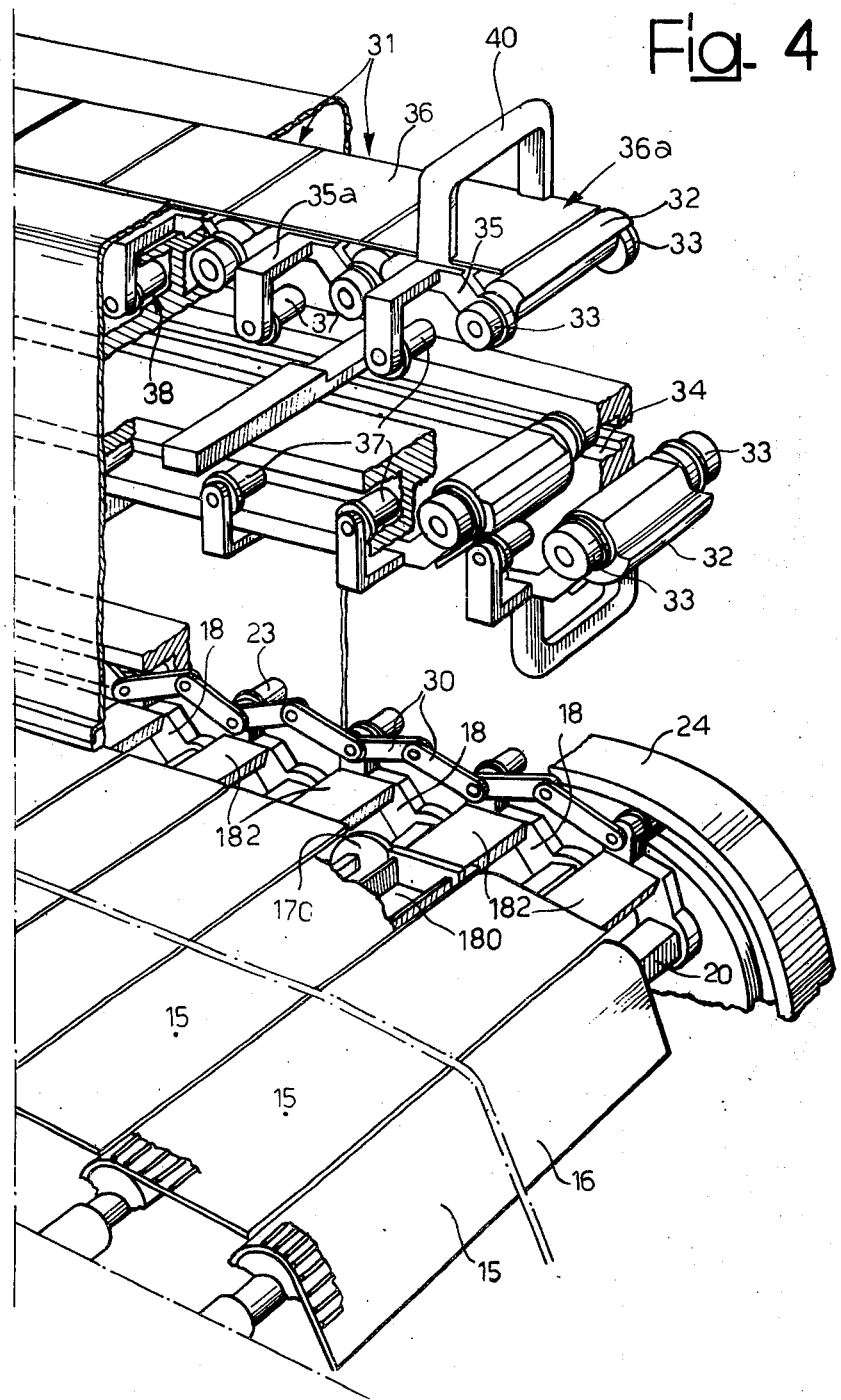

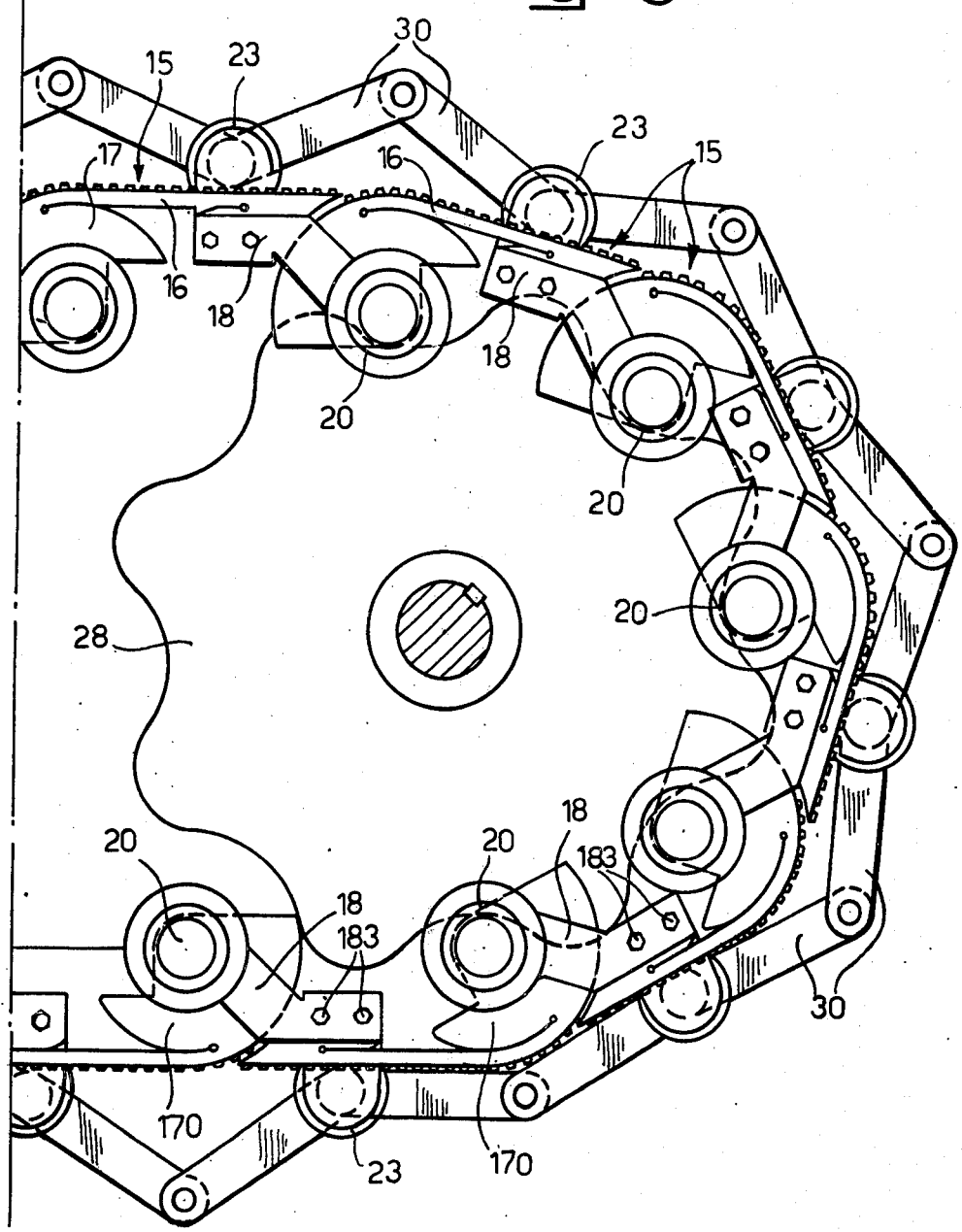

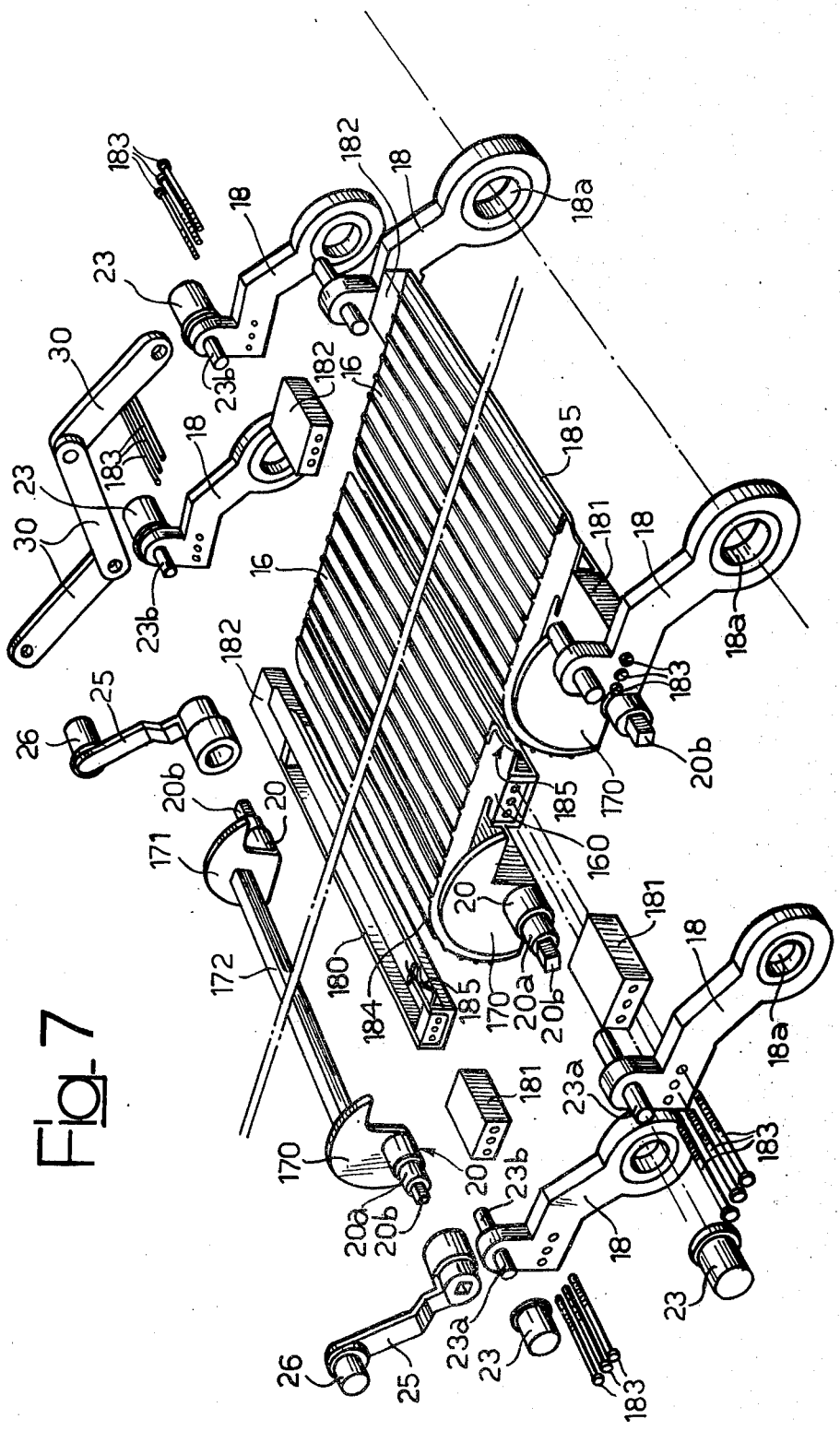

CONVEYOR, PARTICULARLY FOR PASSENGERS

This invention relates to conveyors constructed and arranged in a manner whereby a passenger may walk onto the conveyor at a safe low speed, then be accelerated to a speed which is higher than the initial speed, conveyed at that high speed, and decelerated to a low speed at which he is safe to walk off the conveyor.

A conveyor constructed and arranged in the above manner is disclosed by British Patent Specification No. 1,273,561. This prior conveyor comprises a belt guided on a path established by a pair of guide rails. The belt is composed of a plurality of consecutive belt segments. Each of the segments has one end part carrying an elongated roll extending horizontally transversely of the belt, and a flexible opposite end part which is deflected away of the path of the belt by passing around the roll carried by the next segment. The said flexible part terminates by a rigid horizontal transverse shaft carrying a pair of cam-follower rollers at its opposite ends, each of the cam-follower rollers being guided in a cam rail which is spaced at varying distances from its respective guide rail for the belt. Thus, the deflected length of each of the belt segments varies in proportion to the distance of the cam rail from the guide rail. The said distance progressively decreases in the acceleration zone and progressively increases in the deceleration zone of the conveyor.

The above brief description of the prior conveyor is believed sufficient to show that each of the deflected lengths of the belt segments is a sort of pendulum which is subjected to the tractive effort acting in the belt and at the same time its cam-follower rollers are requested to smoothly travel along their cam rails. In practice, the tractive effort in the belt and, consequently, the frictional resistance opposing the movement of the cam-follower rolls in their rails are subject to large variations, depending upon both the instantaneous number of passengers on the conveyor and their distribution and behaviour (standing still or walking). Thus, the deflected lengths of the belt segments perform pendular movements and, therefore, are continuously subjected to variations in length, with the consequence that the speed of each of the belt segments is not represented by a smooth line on a speed vs. time (or speed vs. displacement diagram but rather by a "saw teeth" line denoting an infinite number of instantaneous accelerations and decelerations of a largely variable entity to which a passenger is undesirably exposed during transport.

A main object of this invention is to provide an improved conveyor of the type referred to hereinbefore, thereby to avoid the abovementioned drawbacks. A further object of the invention is to provide an improved conveyor in which only one cam rail may be sufficient (if desired) to control the unit segments. Further objects and advantages will become evident from the following description.

In accordance with the above, this invention provides a conveyor of the type comprising: a conveyor belt composed of a plurality of consecutive belt segments; each of the segments having one end part carrying a deviation member extending horizontally transversely of the belt and guided on a pair of guide rails, and an opposite end part which is flexible and is deflectable away of the path of the belt by passing around the deviation member carried by the neighbour segment; and means for varying the length of the deflected portion of each of the belt segments, said means including a cam rail spaced at varying distances from its respective guide rail for the deviation member; the said conveyor being characterized in that the deviation member is a rotatable winding member having anchored thereto its associable flexible part of its neighbour segment thereby the deflected length of the said neighbour segment may be varied by rotation of the winding member, and the said means comprises a crank fast with the winding member, said crank having a crank-pin operatively engaging with the cam rail in an arrangement whereby the winding member is rotated by the crank to wind the flexible part thereonto as the distance of the cam rail from the guide rail increases, and to unwind the same flexible part therefrom as the said distance decreases.

In the appended drawings:

FIG. 3 is a broken part-view of a detail III of FIG. 2;

FIG. 4 is a broken part-view of a detail IV of FIG. 2;

FIG. 5 is a cross-sectional view on line V—V of FIG. 2;

FIG. 7 is an exploded part-view concerning three subsequent belt segments;

Figure 1:
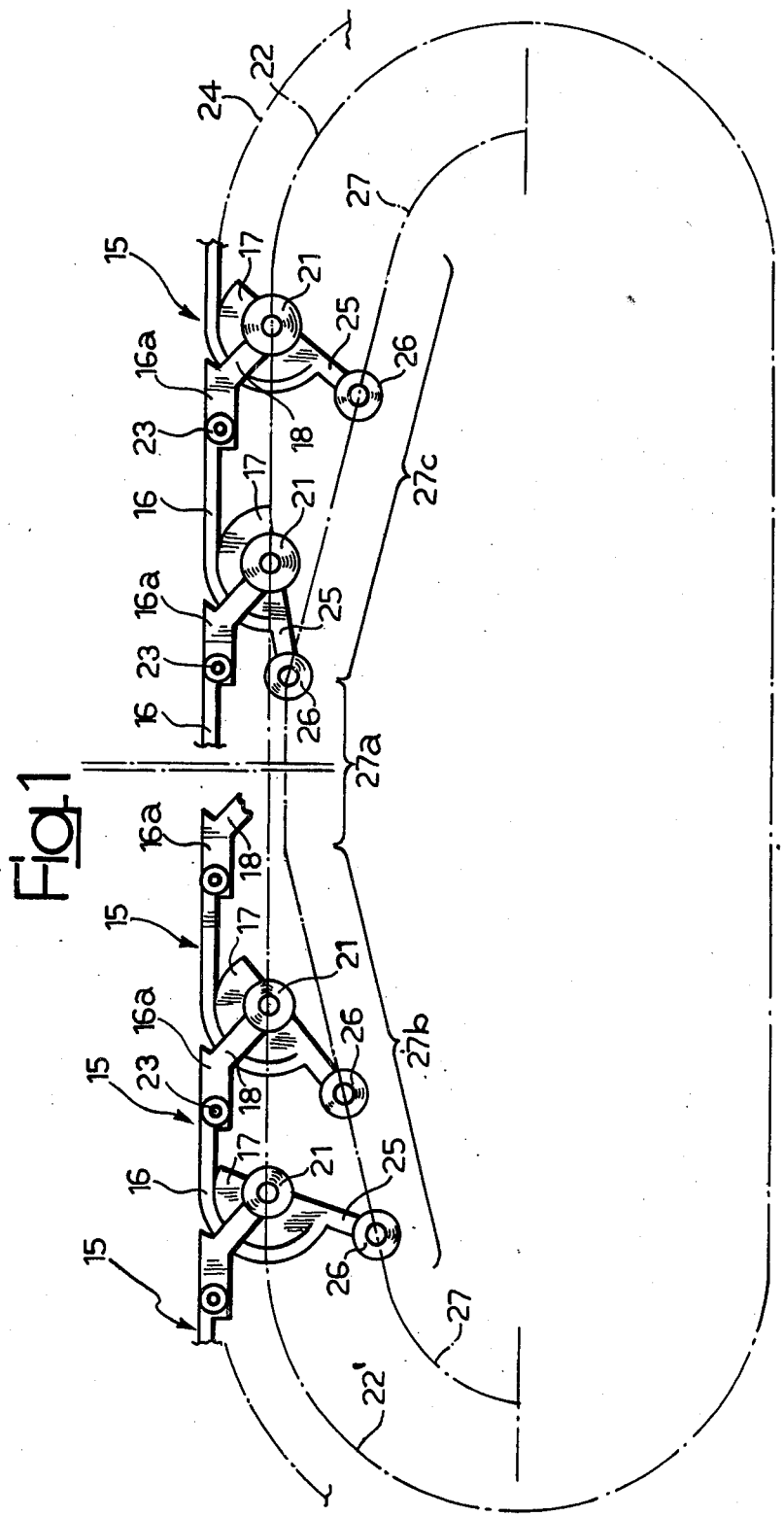
FIG. 1 is a schematic representation of the conveyor.
Figure 2:
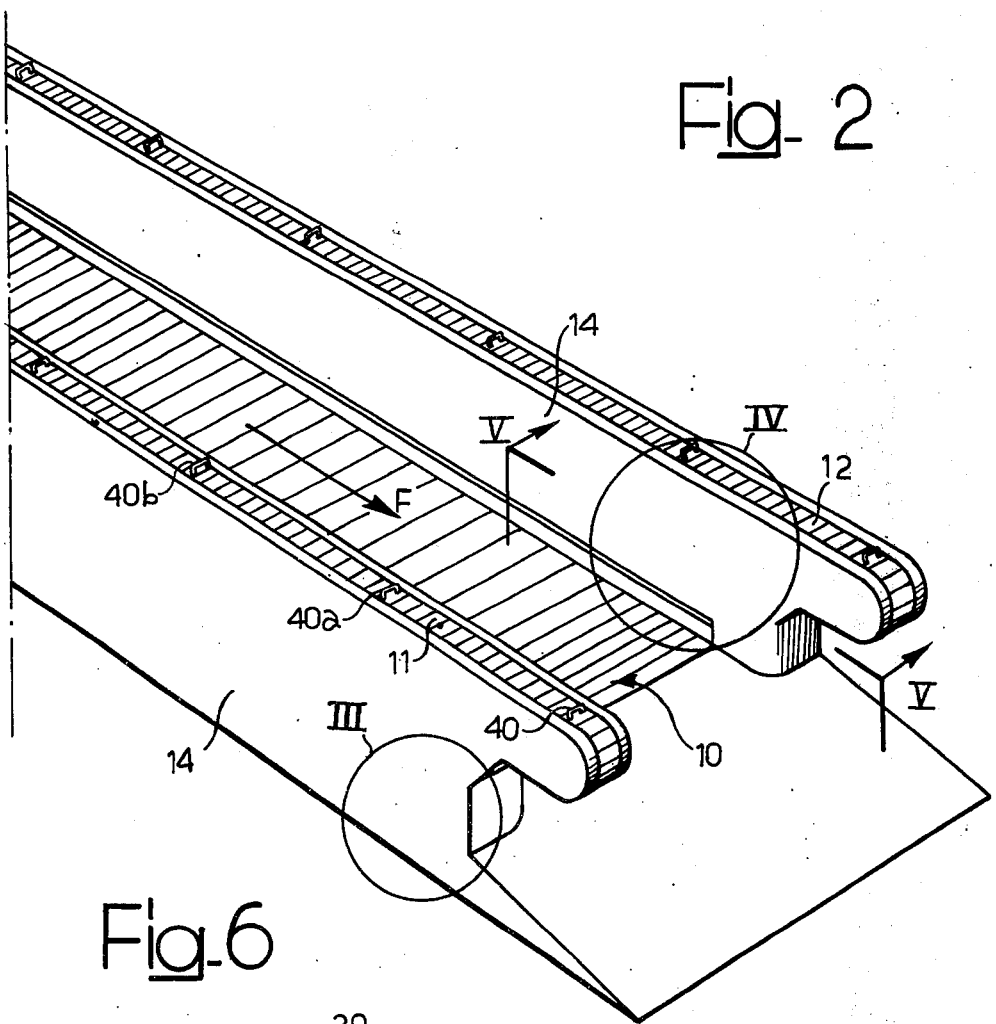
FIG. 2 is a perspective view of an end section of a practical embodiment of the conveyor.

Referring first to FIG. 1, the conveyor comprises a conveyor belt composed of a plurality of belt segments 15, arranged to circulate on a closed path. Each of the segments comprises an end portion, denoted by 16a, of a relatively rigid structure, and an opposite end portion 16 which is flexible to behave similarily to a roller blind. The portion 16a has at each of its lateral edges a roller 23 rolling on a guide rail 24, and carries by means of lateral arms 18 a pair of further rollers 21 each of which rolls on its respective guide rail 22. Each pair of rollers 21 crank-pins a winding member 17 to which the free end of the flexible portion 16 is anchored. The member 17 has a crank 25 angularly fast therewith, including a crankpin 26 (e.g. in the form of a roller bearing) rolling on a cam rail 27. As far as the upper run, i.e. the load carrying run, of the conveyor is concerned, the rails 22 and 24 are parallel to each other, whereas the cam rail 27 has an intermediate section 27a parallel to the guide rail 22 and opposite end sections 27b, 27c diverging from the guide rail 22 to a maximum extent which is less than the length of the cranks 25 (as measured between the axes of the roller 21 and crank-pin 26). It is evident from the above that each of the belt segments is connected to its neighbour segments via the arms 18, the winding members 17 and the free end of the flexible portion 16 anchored to the member 17, so that an endless belt is obtained which may be driven in a manner known per se, or obvious, by a conventional constant speed motor unit acting at one end of the conveyor in a manner whereby the upper run of the conveyor is tensioned. The direction of movement is practically immaterial, Supposing that the direction of movement in FIG. 1 is anticlockwise, the motor unit will act on the belt in the region of the left-hand loop 22' of the guide rail 22 to tension the upper run of the belt. It will be seen that, under these conditions, the sections 27c of the cam rail 27 produces, through the crank pins 26 and cranks 25, unwinding of the flexible portions 16 from their associated winding members, whereby the section 27c acts as accelerating section in the conveyor. The section 27a, parallel to the guide rail 22, does not influence the angular position of the members 17 and, therefore, is a constant speed section. Finally, the section 27b of the cam rail 27 acts on the members 17 in the sense to wind onto the latter their associated flexible portions 16 of the segments and, therefore, is the decelerating section in the conveyor.

A pair of guide rails 22 is necessary to guide the conveyor belt, whereas a single cam rail 27 arranged at one lateral side of the conveyor may be sufficient to control the winding and unwinding movements of members 17, especially in light-duty conveyors. It is also evident that the rollers 23 on the belt segments may be arranged to roll on the guide rails 22, rather than on the guide rails 24, so that the expense connected with the auxiliary guide rails 24 may be avoided. It is to be noted, however, that the presence of the said auxiliary guide rails 24 proves useful for both constructional reasons and a better guide of the belt segments at the entrance to and the exit from the looped end regions of the rails.

A practical embodiment of the conveyor generally described above is shown in FIGS. 2–7.

Reference 10 denotes the upper run of the conveyor belt moving in direction F. The conveyor, designed for transporting passengers, also comprises two endless handrails 11, 12, supported by the flanks 14 of the conveyor. The handrails are designed to move in accordance with the run 10 and, therefore, are constructed in a manner substantially similar to the structure of the conveyor belt, as will be seen hereinafter.

The conveyor band 10 is formed by a number of band segments 15 interconnected to form a continuous band closed in a ring. Each segment 15 comprises a plate 16 of a flexible material such as rubber, joined to a curved winding support 17, which can rotate about its own axis. The support 17 is sector-shaped in cross section can have either a circular profile as illustrated, or, in certain cases, a profile formed by curves of second or third order. The plate 16 has an end integrally formed with the support 17 and an opposite end portion 16a connected to the adjacent support by a pair of rigid arms 18. More particularly, (FIGS. 6 and 7) each sector-shaped support 17 is formed by a block of rubbery material, especially a mixture of synthetic elastomers, and carries in a single piece the plate 16 forming with the support a slit 19. The block of the support is comprised between two metallic end plates 170, 171 rigidly connected by a prismatic shaft 172 embedded into the material of the support 17.

The end portion 16a of each belt segment 15 is furthermore provided with a transversely extending bead 160. The bead 160 is contained in a channel section metal cross bar 180, and firmly bonded to it by vulcanization. The cross-bar 180 is provided with metallic heads 181, 182 used to rigidly connect the cross-bar to the feet of the arms 18 by means of bolts 183, the arm 18 ending each by an eye 18a. The plate 16 also includes set in the elastomeric mixture which forms it, a flexible reinforcement, for example ply reinforcement, or woven metal cables, or a composite structure formed by many superimposed plies obtained with woven synthetic materials and/or metallic threads. Each channel section cross-bar 180 is also provided, in correspondence with its border facing the adjacent belt segment, with a metal trimming 185 of a vee-profile; the trimming 185 is desirable for reducing the friction between adjacent plates 16 in case of a contact, also in case of the inclusion of a foreign body between the terminal edge of the plate and the adjacent plate.

The end plates 170, 171 of the metal reinforcement of each support 17 each carry a trunnion 20, the trunnions being aligned on a common axis forming the rotation axis of the support and may, or may not be aligned with the shaft 172. Each trunnion 20 rotatably engages in the eye 18a in its associated arm 18 belonging to the neighbour belt segment.

According to this invention, each sector-shaped support 17 is controlled to rotate about its axis to draw in, by winding, or to let out by unrolling, a variable portion of the plate 16 thus varying the mutual distance of the axes of adjacent supports. To this end each trunnion 20 is provided with an axial cylindrical extension 20a carrying a supporting roller 21 which rolls on a corresponding guide rail 22. Two guide rails 22 are positioned at the sides of the conveyor belt 10.

A further pair of rollers 23 is provided on pins 23a projecting outwardly from the root portion of each of the arms 18. The rollers 23 roll in the grooves of corresponding channeled guide rails 24. In the case of heavy loads the rollers 23 can be replaced by magnetic repulsion bearings or by aircushions. Also the guides 24 border the conveyor belt 10 and extend along the whole length of the upper run.

Each extension 20a ends by a prismatic coupling pin 20b projecting beyond the supporting roller 21, for the fitting of a crank lever 25 producing the controlled rotation of the support 17. Each crank lever 25 has a crank pin provided with a cam follower roller 26 engaged in a channel section cam rail 27 extending along a lateral side of the belt 10 and has portions of a variable inclination to its corresponding guide rail 22 to produce a corresponding rotation of the crank lever and of the associated support 17 around the axis determined by the trunnions 20.

Figure 6:
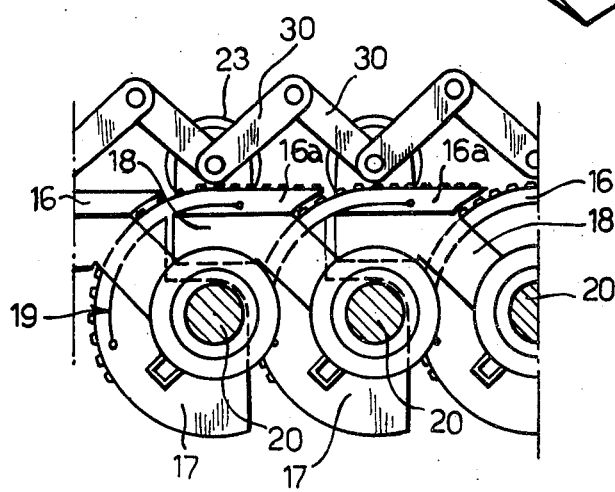
FIG. 6 is a cross-sectional detail view showing the belt segments in their most shortened condition.

With reference to FIG. 6 it can be realized that when a crank lever is rotated anti-clockwise this well produce a corresponding winding of a portion of the plate 16 onto the relative support 17 and vice versa.

The conveyor belt is driven at one end by a pair of sprocket wheels 28 (FIG. 5).

Each wheel is profiled with a series of lobed gear teeth which drivingly engage the trunnions 20 of the supports 17; the angular spacing of the lobes corresponds to the maximum mutual spacing of the axes of the trunnions 20. The angular speed of the driving wheels 28 determine the maximum speed of the belt segments in the upper run of the conveyor. In the initial portion of the conveyor the acceleration is obtained by adding to the pulling speed the relative speed of the adjacent segments which are extended by the effect of the rotation of their winding supports producing unwinding of the plates 16 from the supports. The value of this relative speed is in proportion to the local inclination of the cam rail 27 to the guide rail 22. The relative speed can be constant to produce a motion at a constant acceleration. This can be obtained with a constant inclination of the cam rail 27. If desired, the relative speed can be variable to produce a corresponding variation of acceleration in the advancement direction of the conveyor. This will be obtained with a suitable longitudinal profile of the cam rail 27. Similarly at the delivery end of the conveyor, the deceleration is obtained by reducing the constant advancement speed by the relative speed resulting from winding of the plates 16 onto the supports 17. Again this relative speed can be constant or variable according to the profile and to the inclination of the cam rail 27. In the intermediate area, denoted by 27a in FIG. 1, the segments 15 of the belt advance with a constant speed corresponding to the maximum speed reached at the end of the acceleration. The advancement is produced through the traction exerted by the driving wheels 28 on the belt segments through trunnions 20. The traction force is thus exerted on the rigid end portion 16a of each segment which is pulled by its cross-bar 180 and by the arms 18 belonging to the adjacent segment. It is therefore necessary that the connection between the portion 16a and the arms 18 is able to absorb the stress due to the traction forces. This is obtained by providing the portion 16a with the bead 160 vulcanized to the cross-bar 180 as described above.

As, however, an abnormal load could cause tearing of one or more plates and the consequent interruption of the belt, the use of safety means may be advisable, formed for example by a chain (FIG. 3) of mutually pivoted rigid links 30 in a zig-zag arrangement connecting the supports of the adjacent belt segments along with each longitudinal border of the belt. Every second articulation of the links 30 is made by means of a pin 23b (coaxial with pin 23a, FIG. 7) at the root part of a corresponding arm 18.

Also the handrails 11 and 12 are, in the same way as described for the conveyor, each formed by a continuous belt formed by a number of inter-connected segments 31 (FIG. 4). Each of them comprises a sector-shaped winding support 32, with end rollers 33 running on corresponding support guides 34, and with arms 35 connecting an end portion 36a of a flexible plate 36 to the adjacent support. The arms 35 are each provided with a lateral bracket 35a which carries a support roller 37 engaging a corresponding channel section guide 38. Also the supports 32, as previously described for the supports 17, are provided each with a control crank lever (not shown) which, engaging a corresponding can guide, will produce the controlled rotation of the support 32 to obtain the acceleration or the deceleration of corresponding segments of the handrail. Some of the segments 31 will furthermore be provided with grab handles 40. These will be duly spaced to allow a natural spacing of the passengers and an easy grasp of the handrail. A number of handles like 40, 40a, 40b (FIG. 2) can be provided on the handrail at an interval of six handrail segments corresponding to a spacing of about one metre.

Preferably, according to this invention, each sector-shaped support 32, the relative flexible plate 36, the arms 35 and the supporting bracket 35a of the rollers 37 will be integrally formed by moulding in plastics or elastomeric material. This provides a handrail which is particularly silent in operation and easy to maintain. Obviously, the cam guides co-operating with the control cranks of the handrail supports 32 have a profile corresponding to that of the cam rails 27 which control the rotation of the supports 17. Thus also the sprocket wheels for driving the handrail belt (not shown) will have the same peripheral speed as the driving wheels 28 so that the vertically corresponding segments of the upper run of the handrail and of the upper run of the conveyor will move at the same speed and with the same acceleration or deceleration.

Figure 8:
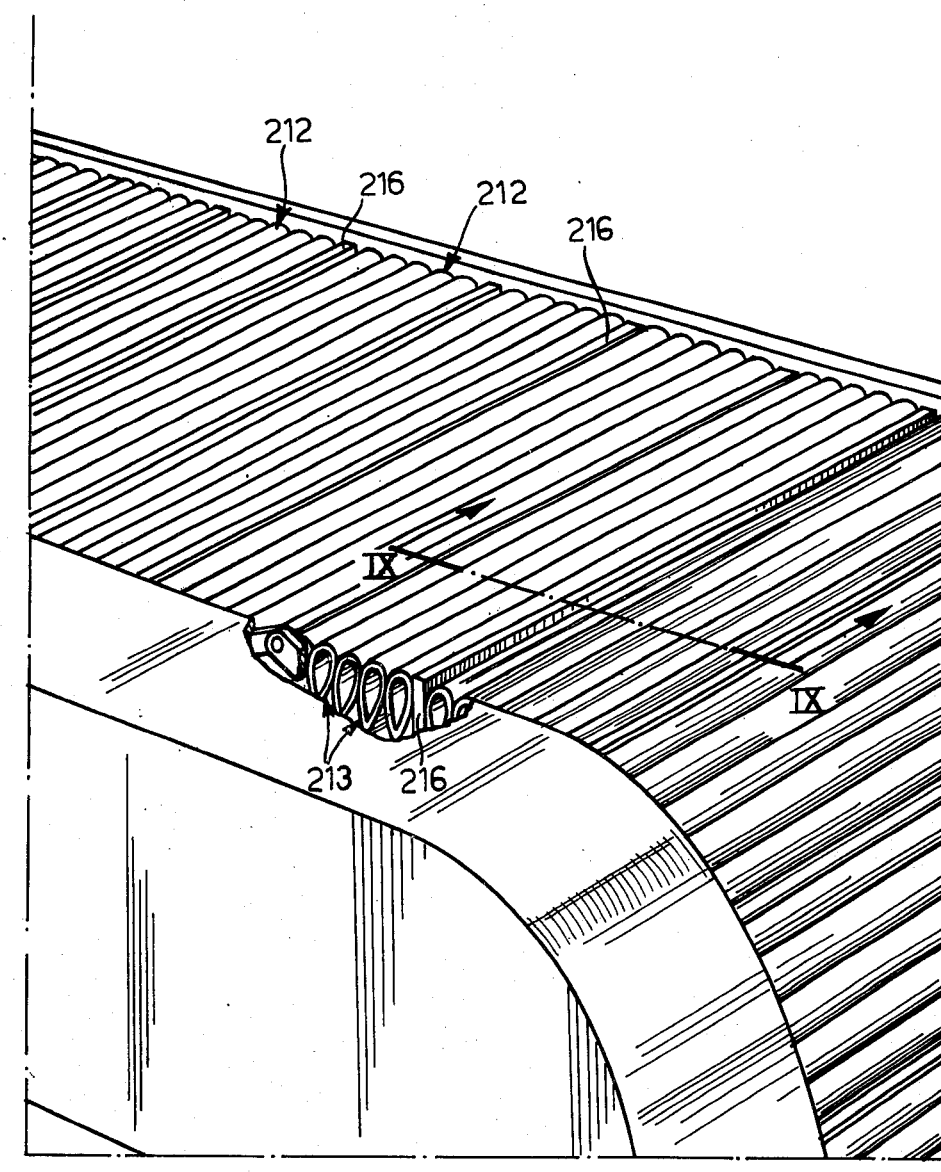
FIG. 8 is a perspective part-view of a modified embodiment of the conveyor of FIGS. 2–7.
Figure 9:
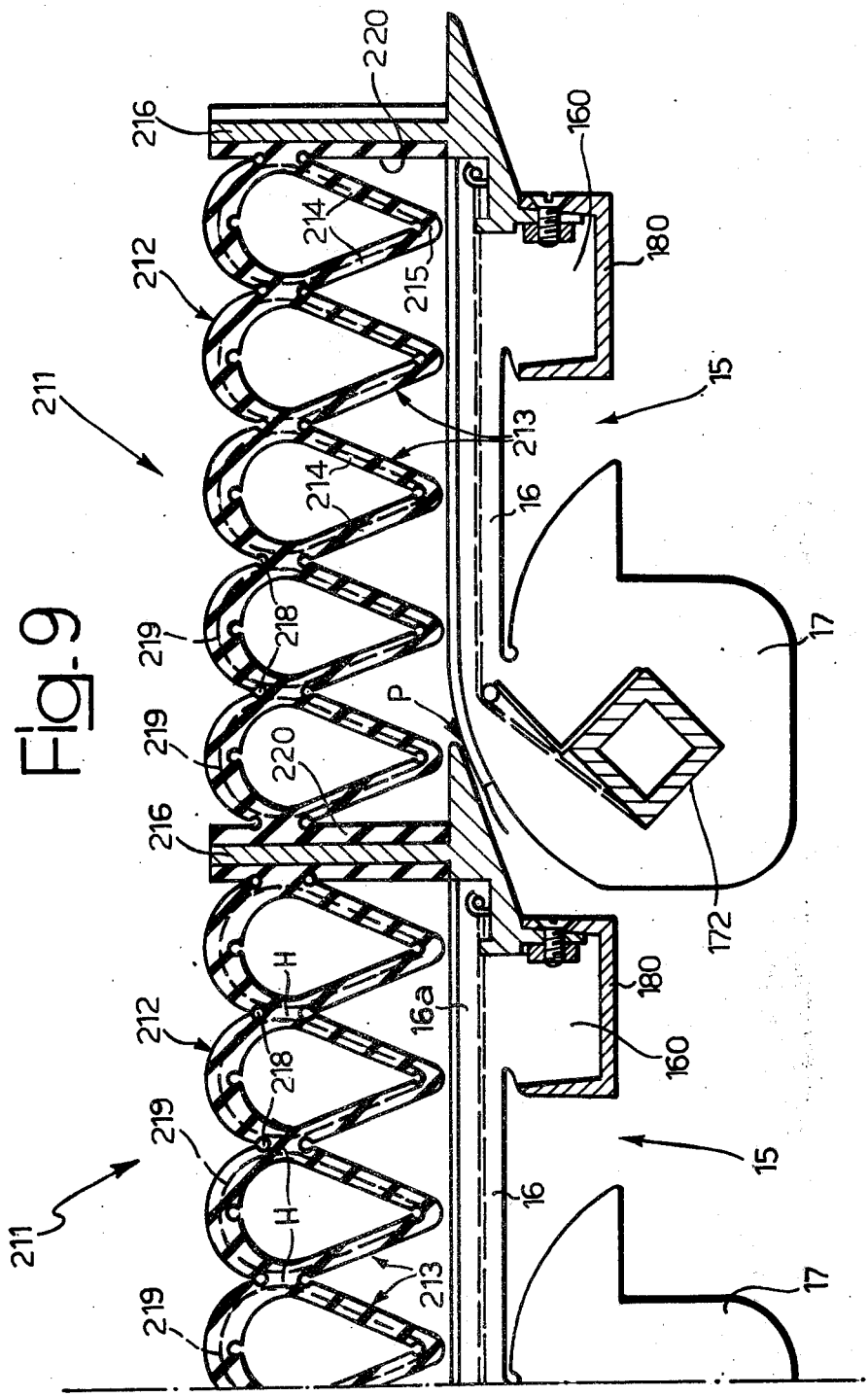
FIG. 9 is a cross-sectional view on line IX—IX of FIG. 8 in unrolled condition of belt segments.
Figure 10:
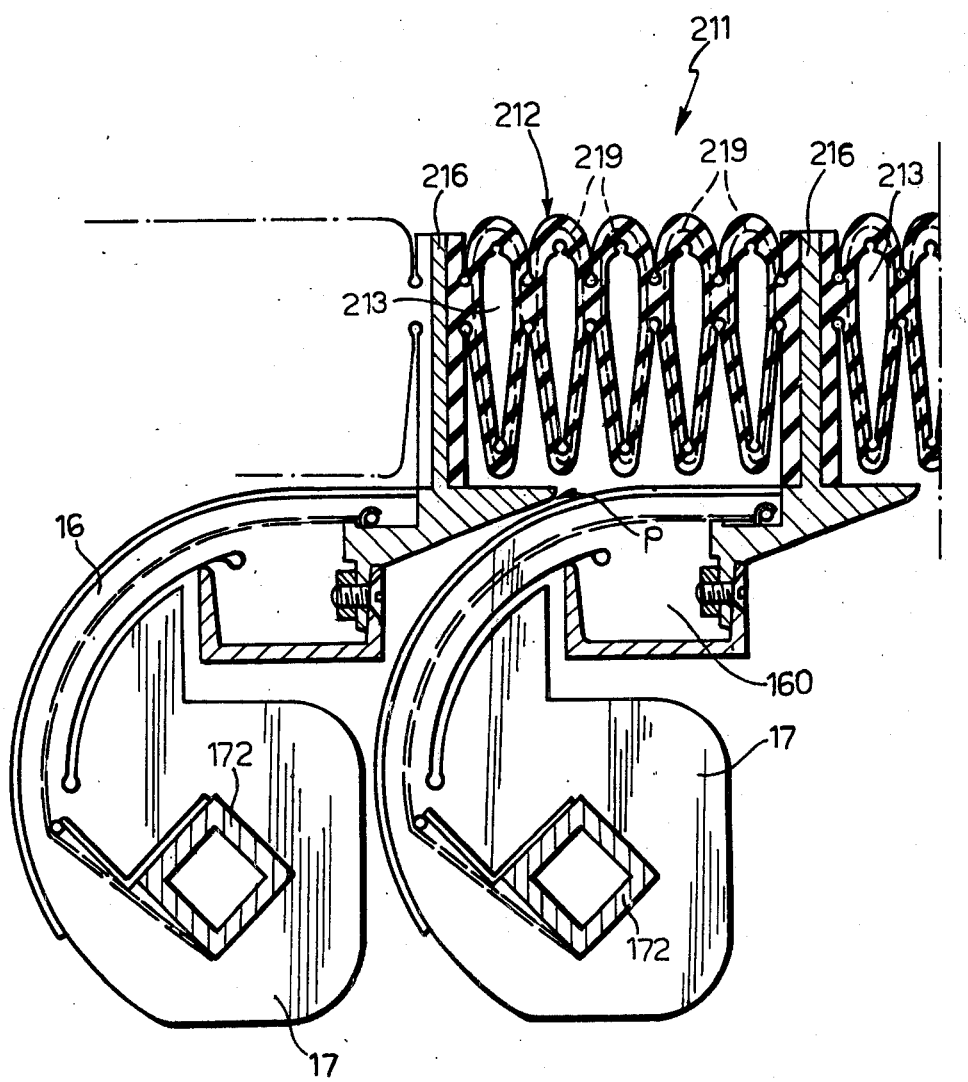
FIG. 10 is a cross-sectional view similar to FIG. 9, showing the belt segments in their most shortened condition.

The embodiment shown in FIGS. 8–10 provides a resilient covering structure which permits the elimination of gaps in continuity in the tread surface of the conveyor belt between adjacent belt segments and which allows at the same time the mutual displacement of these segments to vary the speed of advance in the acceleration and deceleration regions of the conveyor.

The said embodiment also provides a resilient covering structure adapted to form a tread surface which can react elastically to the variation in length of the segments and in which the defomation occurs mainly through compressive forces to ensure the best conditions of use of the elastomeric materials forming the structure itself which, as is known, are subjected to rapid wear if stressed in tension.

The embodiment of FIGS. 8–10 further provides a load carrying covering structure able to ensure elastic deformability in the longitudinal direction of advance of the surface of the conveyor and at the same time a sufficient rigidity in vertical and transverse directions corresponding to the stresses of the load carried on it.

The said covering structure is constituted by a number of covering segments each formed by a coherent series of transverse tubular sections of elastomeric material forming together a belows-like pad extensible in the longitudinal direction of the conveyor belt, each pad having its terminal tubular sections fixed to their respective transverse shoulders protruding from the external surface of mutually adjacent belt segments in an arrangement wherein every two consecutive pads have in common a shoulder on a belt segment.

Preferably the load-bearing, exposed wall of each tubular section is of a substantially circular cross sectional profile, whereby the tread resulting surface of the conveyor is transversely undulated to allow elastic compressive deformation in the longitudinal direction of the belt without buckling.

Each tubular section can have, set into the thickness of the elastomeric component, a reinforcement, for example a reinforcing ply, or a steel lamination or a metal wire mesh, to increase the resistance to deformation by vertical loads pressing on the section.

The covering pads are connected to the shoulders of the belt segments either in a permanent manner or removably by means of vulcanization or through a mechanical connection, for example a dovetail joint.

In FIGS. 8–10 parts described hereinbefore with reference to FIGS. 1–7 are indicated by similar reference numerals.

Reference P indicates a transversely extending gap between adjacent belt segments 15 allowing windings and unrolling of segment portions 16 on rotation of supports 17. The presence of the gap P is undesirable both as regards the possible insertion of foreign bodies and as regards the safety of the passengers since the gap can trap pieces of clothing or various objects with a risk to safety.

According to this invention the tread surface of the conveyor is formed by a number of longitudinally extensible pads 211. Each pad 211 is formed by a coherent series of transversely extending tubular sections 213 of elastomeric material forming a bellows-like structure allowing elastic contraction of the pad without significant variations in the surface itself, in particular without the pad bending or deforming upwards to form humps or in any way varying its characteristics of form.

It is advantageous for this purpose if the exposed surface wall 212 of each section 213 is formed by a circular arc. The walls 114 of each tubular section 213 at the underside of the pad are advantageously planar and converging towards the underlying belt segments 15. Reference H denotes the regions at which the tubular sections 213 are bounded to each other. The apical regions 215 formed by each pair of walls 214 slidingly bear on their associate belt segments when a loads is applied to the pad.

A transversely extending shoulder 216 protrudes from the exposed surface of each of belt segments 15 at the region of the substantially rigid end portion formed by the parts 16a, 160 and 180. Each covering pad 211 is inserted between a pair of consecutive shoulders with a light precompression so as to be under compression even when the spacing between the shoulders is a maximum (FIG. 9) so that in operation of the conveyor the occurrence of tensile stresses in the pad is prevented.

Each pad is anchored at the shoulders 216 by its terminal tubular sections. The latter have each a rubber sole 220 integral therewith, bonded to its respective shoulder.

FIG. 10 shows the configuration assumed by the covering pad when the belt segments of the conveyor are in the position of their minimum effective length. It will be seen that the tubular sections 213 undergo a flattening. To assist this deformation of the tubular sections 213 it is advantageous if in the regions of connection H of the contiguous sections grooves such as 218 are provided, whereby the occurrence of high shear stresses, with consequent possible tearing is avoided. With the object of improving the load resistance of the covering pad it is also envisaged that each tubular section 213 will be provided with a reinforcement 219 embedded into the elastomeric component, for example a reinforcing ply or a steel lamination or a metal wire mesh; reinforcements of this type are able to distribute the stresses, thereby avoiding excessive unitary loads on regions 215 supporting the tubular section.

What we claim is:

1. A conveyor of the type comprising: a conveyor belt composed of a plurality of consecutive belt segments; each of the segments having one end part carrying a deviation member extending horizontally transversely of the belt and guided on a pair of guide rails, and an opposite end part which is flexible and is deflectable away from the path of the belt by passing around the deviation member carried by the neighbour segment; and means for varying the length of the deflected portion of each of the belt segments, said means including a cam rail spaced at varying distances from its respective guide rail for the deviation member; the said conveyor being characterized in that the deviation members is a rotatable axially elongated winding member having anchored thereto its associated flexible part of its neighbour segment whereby the deflected length of the neighbour segment may be varied by rotation of the winding member, and the said means comprises a crank fast with the winding member, said crank having a crank-pin operatively engaging with the cam rail in an arrangement whereby the winding member is rotated by the crank to wind the flexible part thereonto as the distance of the cam rail from the guide rail increases and to unwind the said flexible part therefrom as the same distance decreases.

2. The conveyor of claim 1 comprising a pair of arms extending from the said one end part of each of belt segments, and the said winding member of a belt segment rotatably carried by the pair of arms belonging to a neighbour segment.

3. The conveyor of claim 2 comprising the said winding member having a trunnion projecting axially at each of its ends, an eye in each of said arms in which the respective trunnion is rotatably supported, an axial extension on each of the trunnions carrying a roller supporting the winding member from its respective guide rail, at least one of the extensions ending by a prismatic coupling pin to which the said crank is fitted.

4. The conveyor of claim 2 comprising the said winding member having a trunnion projecting axially at each of its ends, an eye in each of said arms in which the respective trunnion is rotatably supported, an axial extension on each of the trunnions carrying a roller supporting the winding member from its respective guide rail, at least one of the extensions ending by a prismatic coupling pin to which the said crank is fitted, a roller rotatably supported by a root part of each of the arms, and the conveyor comprising an auxiliary guide rail for the last named roller.

5. The conveyor of claim 1 comprising the said winding member formed by an elastomeric block of a sector-shaped cross-sectional profile, the said member having a metal reinforcement comprising a pair of end plates at the axially opposite ends of the block and a shaft embedded in said block to interconnect the end plates, each of the end plates having a trunnion axially projecting therefrom, an axial extension on each of the trunnions carrying a roller supporting the winding member from its respective guide rail, at least one of said extensions ending by a prismatic coupling pin to which the said crank is fitted, the conveyor moreover comprising a pair of arms extending from the said one part of each of belt segments, and an eye in each of said arms having rotatable therein a trunnion of the winding member belonging to the neighbour segment.

6. The conveyor of claim 5, wherein the said one end part of the belt segment is formed with a bead fastened in a channel section cross-bar, each of the two arms associated with the segment having a root portion bolted to the said cross-bar.

7. The conveyor of claim 5, comprising a chain of mutually pivoted rigid links in a zig-zag arrangement along each longitudinal border of the conveyor belt, every, second articulation of said chain comprising a pivot pin fast with a corresponding arm, said chain limiting the maximum extension of the belt in case of rupture of a belt segment.

8. The arrangement of claim 5, moreover comprising a handrail formed by a number of handrail belt segments interconnected to form a continuous handrail belt, and means whereby the speed of a segment in the upper run of the handrail belt is always equal to the speed of the vertically corresponding segment in the upper run of the conveyor belt.

9. The conveyor of claim 5, moreover comprising a continuous handrail belt extending along the conveyor formed by a sequence of interconnected handrail belt segments, each of the latter segments comprising a winding member having a pair of supporting rollers, a flexible plate having one end anchored to the winding member belonging to an adjacent handrail belt segment, the said plate having a pair of arms extending therefrom between which the winding member is rotatably supported, and a bracket fast with the said arms carrying a further supporting roller for the handrail belt segment, a crank fast with the winding member controlling the extent of rotation of the latter, the conveyor also including a guide rail for said pair of supporting rollers, a further guide rail for the said further supporting roller, and a cam rail controlling the said crank, in an arrangement whereby the speed of a segment in the upper run of the handrail belt is always equal to the speed of its vertically corresponding segment in the upper run of the conveyor belt.

10. The conveyor of claim 9, wherein, in each of the handrail belt segments, the winding member, the flexible plate, the arms and the crank are integrally formed of elastomeric material.

11. A conveyor of the type comprising: a conveyor belt composed of a plurality of consecutive belt segments; each of the segments having one end part carrying a deviation member extending horizontally transversely of the belt and guided on a pair of guide rails, and an opposite end part which is flexible and is deflectable away of the path of the belt by passing around the deviation member carried by the neighbour segment; and means for varying the length of the deflected portion of each of the belt segments, said means including a cam rail spaced at varying distances from its respective guide rail for the deviation member; the said conveyor being characterized in that the deviation member is a rotatable axially elongated winding member having anchored thereto its associated flexible part of its neighbour segment whereby the deflected length of the neighbour segment may be varied by rotation of the winding member, and the said means comprises a crank fast with the winding member, said crank having a crank-pin operatively engaging with the cam rail in an arrangement whereby the winding member is rotated by the crank to wind the flexible part thereonto as the distance of the cam rail from the guide rail increases and to unwind the said flexible part therefrom as the said distance decreases; the said conveyor moreover comprising a covering structure on each of the belt segments extending over the gap between adjacent segments, the said structure comprising a coherent series of transverse tubular sections of flexible elastomeric material forming together a bellowslike pad extensible in the longitudinal direction of the conveyor belt, a transverse shoulder protruding from the external surface of each of the belt segments in the region of said one end part of the segment, each of the pads having its terminal tubular sections fixed to their respective shoulders belonging to mutually adjacent belt segments.

12. The conveyor of claim 11, wherein the load-bearing wall of each tubular section in the pad is of a substantially circular cross-sectional profile, the underside of the tubular section being formed by a pair of substantially planar walls converging towards the underlying belt segment.

13. The conveyor of claim 11, wherein the terminal tubular sections of the pad are removably fixed to their respective shoulders.

14. The conveyor of claim 11, wherein the terminal tubular sections have each a sole portion permanently bonded to its respective shoulder.

* * * * *